United States Patent
Li et al.

(10) Patent No.: US 10,885,900 B2
(45) Date of Patent: Jan. 5, 2021

(54) DOMAIN ADAPTATION IN SPEECH RECOGNITION VIA TEACHER-STUDENT LEARNING

(71) Applicant: Microsoft Technology Licensing, LLC, Redmond, WA (US)

(72) Inventors: Jinyu Li, Redmond, WA (US); Michael Lewis Seltzer, Seattle, WA (US); Xi Wang, Beijing (CN); Rui Zhao, Bellevue, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/675,249

(22) Filed: Aug. 11, 2017

(65) Prior Publication Data
US 2019/0051290 A1    Feb. 14, 2019

(51) Int. Cl.
*G10L 15/16* (2006.01)
*G06N 3/08* (2006.01)
(Continued)

(52) U.S. Cl.
CPC .............. *G10L 15/16* (2013.01); *G06N 3/0454* (2013.01); *G06N 3/084* (2013.01); *G10L 15/063* (2013.01);
(Continued)

(58) Field of Classification Search
CPC ......... G10L 15/22; G10L 15/16; G10L 15/00; G10L 15/01; G10L 15/02; G10L 15/06;
(Continued)

(56) References Cited

U.S. PATENT DOCUMENTS 6,999,925 B2    2/2006  Fischer et al.
7,280,987 B2   10/2007  Chen et al.
(Continued)

FOREIGN PATENT DOCUMENTS

CN   103400577 A   11/2013
CN   103456299 A   12/2013
(Continued)

OTHER PUBLICATIONS

Price, et al., "Wise teachers train better DNN acoustic models", In EURASIP Journal on Audio, Speech, and Music Processing, Apr. 12, 2016, 19 pages.
(Continued)

*Primary Examiner* — Qi Han
(74) *Attorney, Agent, or Firm* — Alleman Hall Creasman & Tuttle LLP

(57) ABSTRACT

Improvements in speech recognition in a new domain are provided via the student/teacher training of models for different speech domains. A student model for a new domain is created based on the teacher model trained in an existing domain. The student model is trained in parallel to the operation of the teacher model, with inputs in the new and existing domains respectfully, to develop a neural network that is adapted to recognize speech in the new domain. The data in the new domain may exclude transcription labels but rather are parallelized with the data analyzed in the existing domain analyzed by the teacher model. The outputs from the teacher model are compared with the outputs of the student model and the differences are used to adjust the parameters of the student model to better recognize speech in the second domain.

20 Claims, 7 Drawing Sheets

(51) Int. Cl.
| | |
|---|---|
| *G10L 15/06* | (2013.01) |
| *G10L 15/183* | (2013.01) |
| *G10L 15/065* | (2013.01) |
| *G10L 25/30* | (2013.01) |
| *G06N 3/04* | (2006.01) |
| *G06N 3/12* | (2006.01) |
| *G06N 5/00* | (2006.01) |

(52) U.S. Cl.
CPC .......... *G10L 15/065* (2013.01); *G10L 15/183* (2013.01); *G10L 25/30* (2013.01); *G06N 3/0445* (2013.01); *G06N 3/126* (2013.01); *G06N 5/003* (2013.01)

(58) Field of Classification Search
CPC ..... G10L 15/063; G10L 15/065; G10L 15/14; G10L 15/20; G10L 15/34; G10L 2015/00; G10L 2015/06; G10L 2015/063; G10L 2015/0631; G10L 2015/0635; G10L 2015/0636; G10L 2015/228; G10L 10/06; G10L 10/063
USPC ... 704/232, 231, 36, 40, 243, 244, 250, 255, 704/256.2
See application file for complete search history.

(56) References Cited

U.S. PATENT DOCUMENTS

| | | | |
|---|---|---|---|
| 7,444,282 | B2 | 10/2008 | Choo et al. |
| 7,613,665 | B2 | 11/2009 | Chen et al. |
| 7,624,020 | B2 | 11/2009 | Yamada et al. |
| 7,634,409 | B2 | 12/2009 | Kennewick et al. |
| 7,805,300 | B2 | 9/2010 | Gorin et al. |
| 7,835,910 | B1 | 11/2010 | Hakkani-Tur et al. |
| 8,073,879 | B2 | 12/2011 | Meijer et al. |
| 8,185,399 | B2 | 5/2012 | Di Fabbrizio et al. |
| 8,234,312 | B2 | 7/2012 | Thomas |
| 8,380,511 | B2 | 2/2013 | Cave et al. |
| 8,548,805 | B2 | 10/2013 | Chotimongkol et al. |
| 8,566,098 | B2 | 10/2013 | Syrdal et al. |
| 8,676,866 | B2 | 3/2014 | Lemcke et al. |
| 8,751,240 | B2 | 6/2014 | Lewis et al. |
| 8,775,158 | B2 | 7/2014 | Sakao et al. |
| 8,818,808 | B2 | 8/2014 | Hakkani-Tur et al. |
| 8,856,052 | B2 | 10/2014 | Chenthamarakshan et al. |
| 8,954,461 | B2 | 2/2015 | Ware et al. |
| 8,996,371 | B2 | 3/2015 | Hurvitz et al. |
| 9,053,703 | B2 | 6/2015 | Weinstein et al. |
| 9,077,949 | B2 | 7/2015 | Haseyama |
| 9,653,093 | B1 | 5/2017 | Matsoukas et al. |
| 2006/0036430 | A1 | 2/2006 | Hu |
| 2006/0074634 | A1 | 4/2006 | Gao et al. |
| 2007/0016399 | A1 | 1/2007 | Gao et al. |
| 2008/0077392 | A1* | 3/2008 | Kamatani ........... G06F 17/2827 704/7 |
| 2008/0319748 | A1 | 12/2008 | Nakano et al. |
| 2010/0332520 | A1 | 12/2010 | Lu et al. |
| 2011/0093268 | A1 | 4/2011 | Gorin et al. |
| 2011/0302111 | A1 | 12/2011 | Chidlovskii |
| 2012/0232898 | A1 | 9/2012 | Di fabbrizio et al. |
| 2012/0290293 | A1 | 11/2012 | Hakkani-tur et al. |
| 2013/0066632 | A1 | 3/2013 | Conkie et al. |
| 2013/0091184 | A1 | 4/2013 | Alexe et al. |
| 2013/0103382 | A1* | 4/2013 | Kim ................... G06F 17/2827 704/2 |
| 2014/0022426 | A1 | 1/2014 | Minami et al. |
| 2014/0058983 | A1 | 2/2014 | Alexander |
| 2014/0059030 | A1 | 2/2014 | Hakkani-tur et al. |
| 2014/0149121 | A1 | 5/2014 | Di fabbrizio et al. |
| 2014/0164299 | A1 | 6/2014 | Sainath et al. |
| 2014/0201126 | A1 | 7/2014 | Zadeh et al. |
| 2014/0207777 | A1 | 7/2014 | Palmert et al. |
| 2014/0222422 | A1 | 8/2014 | Sarikaya et al. |
| 2014/0278424 | A1 | 9/2014 | Deng et al. |
| 2014/0288935 | A1 | 9/2014 | Lewis et al. |
| 2014/0337026 | A1 | 11/2014 | Ichikawa et al. |
| 2014/0358829 | A1 | 12/2014 | Hurwitz |
| 2014/0379326 | A1 | 12/2014 | Sarikaya et al. |
| 2015/0019202 | A1 | 1/2015 | Tremblay et al. |
| 2016/0078339 | A1 | 3/2016 | Li et al. |
| 2017/0011306 | A1 | 1/2017 | Kim et al. |
| 2017/0011738 | A1* | 1/2017 | Senior ................... G10L 15/063 |
| 2017/0061966 | A1* | 3/2017 | Marcheret ............... G10L 15/25 |
| 2017/0083829 | A1 | 3/2017 | Kang et al. |

FOREIGN PATENT DOCUMENTS

| | | |
|---|---|---|
| CN | 103544705 A | 1/2014 |
| CN | 103886305 A | 6/2014 |
| CN | 103945533 A | 7/2014 |
| CN | 103955702 A | 7/2014 |
| EP | 2261823 A2 | 12/2010 |
| RU | 2418321 C2 | 5/2011 |
| TW | 201430830 A | 8/2014 |
| WO | 2014114116 A1 | 7/2014 |

OTHER PUBLICATIONS

Ruder, et al., "Knowledge Adaptation: Teaching to Adapt", In Journal of Computing Research Repository, Feb. 2017, 11 pages.

Lei, et al., "Unsupervised Domain Adaptation with Multiple Acoustic Models", In Proceedings of IEEE Spoken Language Technology Workshop, Dec. 12, 2010, 6 pages.

Sainath, et al., "Making deep belief networks effective for large vocabulary continuous speech recognition", In Proceedings of IEEE Workshop on Automatic Speech Recognition and Understanding, Dec. 11, 2011, 6 pages.

Dahl, et al., "Context-dependent pre-trained deep neural networks for large-vocabulary speech recognition", In Journal of IEEE Transactions on Audio, Speech, and Language Processing, vol. 20, Issue 1, Jan. 2012, pp. 30-42.

Jaitly, et al., "Application of Pretrained Deep Neural Networks to Large Vocabulary Speech Recognition", In Proceedings of 13th Annual Conference of the International Speech Communication Association, Sep. 9, 2012, 4 pages.

Hinton, et al., "Deep neural networks for acoustic modeling in speech recognition: The shared views of four research groups", In Journal of IEEE Signal Processing Magazine, vol. 29, Issue 6, Nov. 2012, pp. 82-97.

Deng, et al., "Recent advances in deep learning for speech research at Microsoft", In Proceedings of IEEE International Conference on Acoustics, Speech, and Signal Processing, May 1, 2013, 5 pages.

Seide, et al., "Feature engineering in context-dependent deep neural networks for conversational speech transcription", In Proceedings of IEEE Workshop on Automatic Speech Recognition and Understanding, Dec. 11, 2011, pp. 24-29.

Liao, Hank, "Speaker adaptation of context dependent deep neural networks", In Proceedings of IEEE International Conference on Acoustics, Speech and Signal Processing, May 26, 2013, 5 pages.

Yu, et al., "KL-divergence regularized deep neural network adaptation for improved large vocabulary speech recognition", In Proceedings of IEEE International Conference on Acoustics, Speech and Signal Processing, May 26, 2013, pp. 7893-7897.

Xue, et al., "Singular value decomposition based low-footprint speaker adaptation and personalization for deep neural network", In Proceedings of IEEE International Conference on Acoustics, Speech and Signal Processing, May 4, 2014, pp. 6409-6413.

Ko, et al., "A study on data augmentation of reverberant speech for robust speech recognition", In Proceedings of IEEE International Conference on Acoustics, Speech and Signal Processing, Mar. 5, 2017, 5 pages.

Sak, et al., "Fast and accurate recurrent neural network acoustic models for speech recognition", In Proceedings of 16th Annual Conference of the International Speech Communication Association, Sep. 6, 2015, 5 pages.

McLaren, et al., "Improving Robustness to Compressed Speech in Speaker Recognition", In Proceedings of 14th Annual Conference of the International Speech Communication Association, Aug. 25, 2013, pp. 3698-3702.

(56) References Cited

OTHER PUBLICATIONS

Hinton, et al., "Distilling the knowledge in a neural network", In Journal of Computing Research Repository, Mar. 2015, pp. 1-9.

Hirsch, et al., "The Aurora experimental framework for the performance evaluation of speech recognition systems under noisy conditions", In Proceedings of Automatic Speech Recognition: Challenges for the new Millenium ISCA Tutorial and Research Workshop, Sep. 18, 2000, 8 pages.

Markov, et al., "Robust Speech Recognition using Generalized Distillation Framework", In Proceedings of 17th Annual Conference of the International Speech Communication Association, Sep. 8, 2016, pp. 2364-2368.

Watanabe, et al., "Student-teacher network learning with enhanced features", In Proceedings of IEEE International Conference on Acoustics, Speech and Signal Processing, Mar. 5, 2017, pp. 5275-5279.

Vincent, et al., "An analysis of environment, microphone and data simulation mismatches in robust speech recognition", In Journal of Computer Speech & Language, Dec. 2, 2016, pp. 1-36.

Lippmann, et al., "Multi-style training for robust isolated-word speech recognition", In Proceedings of IEEE International Conference on Acoustics, Speech, and Signal Processing, Apr. 6, 1987, pp. 705-708.

Asami, et al., "Domain adaptation of DNN acoustic models using knowledge distillation", In Proceedings of IEEE International Conference on Acoustics, Speech and Signal Processing, Mar. 5, 2017, pp. 5185-5189.

Li, et al., "Learning small-size DNN with output-distribution-based criteria", In Proceedings of Fifteenth Annual Conference of the International Speech Communication Association, Sep. 1, 2014, 5 pages.

Acero, et al., "Robust speech recognition by normalization of the acoustic space", In Proceedings of International Conference on Acoustics, Speech, and Signal Processing, Apr. 14, 1991, 4 pages.

Qian, et al., "A frame mapping based HMM approach to cross-lingual voice transformation", In Proceedings of IEEE International Conference on Acoustics, Speech and Signal Processing, May 22, 2011, pp. 5120-5123.

Sak, et al., "Long short-term memory recurrent neural network architectures for large scale acoustic modeling", In Proceedings of 15th Annual Conference of the International Speech Communication Association, Sep. 14, 2014, 5 pages.

Miao, et al., "Simplifying long short-term memory acoustic models for fast training and decoding", In Proceedings of IEEE International Conference on Acoustics, Speech and Signal Processing, Mar. 20, 2016, 5 pages.

"ETSI noise", https://docbox.etsi.org/stq/Open/EG%20202%20396-1%20Background%20noise%20database/Binaural_Signals, Retrieved on: Jul. 5, 2017, 2 pages.

Lu, et al., "Knowledge distillation for small-footprint highway networks", In Journal of Computing Research Repository, Aug. 2016, 5 pages.

Barker, et al., "The third chime speech separation and recognition challenge: Dataset, task and baselines", In Proceedings of IEEE Workshop on Automatic Speech Recognition and Understanding, Dec. 13, 2015, pp. 504-511.

Maas, et al., "Recurrent neural networks for noise reduction in robust ASR", In Proceedings of In Thirteenth Annual Conference of the International Speech Communication Association, Jan. 2012, 4 pages.

Weninger, et al., "Single-channel speech separation with memory-enhanced recurrent neural networks", In Proceedings of IEEE International Conference on Acoustics, Speech and Signal Processing, May 4, 2014, pp. 3737-3741.

Narayanan, et al., "Ideal Ratio Mask Estimation Using Deep Neural Networks for Robust Speech Recognition", In Proceedings of IEEE International Conference on Acoustics, Speech and Signal Processing, May 26, 2013, pp. 7092-7096.

Wang, et al., "On training targets for supervised speech separation", In Journal of IEEE/ACM Transactions on Audio, Speech, and Language Processing, vol. 22, Issue 12, Dec. 2014, pp. 1849-1858.

Liao, et al., "Large vocabulary automatic speech recognition for children", In Proceedings of 16th Annual Conference of the International Speech Communication Association, Sep. 6, 2015, pp. 1611-1615.

Fainberg, et al., "Improving children's speech recognition through out-of-domain data augmentation", In Proceedings of 17th Annual Conference International Speech Communication Association, Sep. 8, 2016, 5 pages.

"International Search Report and Written Opinion Issued in PCT Application No. PCT/US2018/038646", dated Aug. 24, 2018, 13 Pages.

"Final Office Action Issued in U.S. Appl. No. 13/758,683", dated May 4, 2015, 12 Pages.

"Non Final Office Action Issued in U.S. Appl. No. 13/758,683", dated Nov. 20, 2014, 10 Pages.

"Final Office Action Issued in U.S. Appl. No. 14/792,269", dated May 25, 2018, 18 Pages.

"Non Final Office Action Issued in U.S. Appl. No. 14/792,269", dated Jan. 3, 2018, 14 Pages.

"Final Office Action Issued in U.S. Appl. No. 14/853,485", dated Oct. 30, 2018, 39 Pages.

"Non Final Office Action Issued in U.S. Appl. No. 14/853,485", dated May 29, 2018, 42 Pages.

"Office Action Issued in European Patent Application No. 14901677.6", dated Jan. 26, 2018, 6 pages.

"Supplementary European Search Report Issued in European Patent Application No. 14901677.6", dated Dec. 19, 2017, 5 Pages.

"Office Action Issued in Chinese Patent Application No. 201480068343.X", dated Oct. 8, 2018, 13 Pages.

"Office Action Issued in Japanese Patent Application No. 2017-513728", dated Aug. 30, 2018, 5 Pages.

Ba, et al., "Do Deep Nets Really Need to be Deep?", In Proceedings of the 27th International Conference on Neural Information Processing Systems, Dec. 8, 2014, 6 Pages.

Benesty, Michael, "How many layers are required to be called deep neural network?", Retrieved from: www.quora.com/How-many-layers-are-required-to-be-called-deep-neural-network?, Dec. 20, 2015, 1 Page.

Brause, et al., "Neural Data Mining for Credit Card Fraud Detection", In Proceedings 11th International Conference on Tools with Artificial Intelligence, Nov. 9, 2008, 4 Pages.

Bucilu, et al., "Model Compression", In Proceedings of the 12th ACM SIGKDD International Conference on Knowledge Discovery and Data Mining, Aug. 20, 2006, 7 Pages.

Ciresan, et al., "Multi-Column Deep Neural Network for Traffic Sign Classification", In Proceedings of the Neural Networks, vol. 32, Aug. 2012, 15 Pages.

Collobert, et al., "A Unified Architecture for Natural Language Processing: Deep Neural Networks With Multitask Learning", In Proceedings of the 25th international conference on Machine learning (ICML '08), Jul. 5, 2008, 8 Pages.

Daume III, Hal, "Frustratingly Easy Domain Adaptation", In Proceedings of the 45th Annual Meeting of the Association of Computational Linguistics, Jul. 2009, pp. 256-263.

Dauphin, et al., "Identifying and attacking the saddle point problem in high-dimensional non-convex optimization", In Proceedings of Advances in neural information processing systems, Jun. 10, 2014, 14 Pages.

Dredze, et al. "Online Methods for Multi-Domain learning and Adaptation", In Proceedings of Conference on Empirical Methods in Natural Language Processing, Oct. 25, 2008, 9 Pages.

El-Kahky, et al., "Extending Domain Coverage of Language Understanding Systems via Intent Transfer Between Domains Using Knowledge Graphs and Search Query Click Logs", In IEEE International Conference on Acoustics, Speech and Signal Processing, May 4, 2014, 5 Pages.

Hakkani-Tur, et al., "A Discriminative Classification-Based Approach to Information State Updates for a Multi-Domain Dialog System", In 13th Annual Conference of the International Speech Communication Association, Sep. 9, 2012, 4 Pages.

(56) References Cited

OTHER PUBLICATIONS

Heigold, et al., "Equivalence of Generative and Log-Linear Models", In Proceedings of IEEE Transactions on Audio, Speech, and Language Processing, vol. 19, Issue 5, Jul. 2011, pp. 1138-1148.
Hinton, et al., "Deep Neural Networks for Acoustic Modeling in Speech Recognition", In Proceedings of the IEEE Signal Processing Magazine, vol. 29, Issue 6, Apr. 27, 2012, 27 Pages.
Hopper, T, "Cross Entropy and KL Divergence", Retrieved from: https://tdhopper.com/blog/cross-entropy-and-kl-divergence/, Sep. 4, 2015, 3 Pages.
Jeong, et al., "Multi-domain Spoken Language Understanding with Transfer Learning", In Journal of the Speech Communication, Elsevier Science Publishers, vol. 51, Issue 5, May 1, 2009, pp. 412-424.
Kaya, et al., "Canonical Correlation Analysis and Local Fisher Discriminant Analysis based Multi-View Acoustic Feature Reduction for Physical Load Prediction", In Proceedings of 15th Annual Conference of International Speech Communication Asssociation., Sep. 14, 2014, 5 Pages.
Kim, et al., "New Transfer Learning Techniques for Disparate Label Sets", In Proceedings of the 53rd Annual Meeting of the Association for Computational Linguistics and the 7th International Joint Conference on Natural Language Processing, vol. 1, Jul. 26, 2015, pp. 473-482.
Kinzel, et al., "Theory of interacting neural networks", In Handbook of Graphs and Networks: From the Genome to the Internet, Apr. 2, 2002, pp. 199-217.
Komatani, et al., "Multi-Domain Spoken Dialogue System with Extensibility and Robustness against Speech Recognition Errors", In Proceedings of 7th SIGDAIL Workshop on Discourse and Dialogue, Jul. 2006, 9 Pages.
Lee, et al., "Example-Based Dialog Modeling for Practical Multi-Domain Dialog System", In Proceedings of ACM Speech Communication vol. 51 Issue 5, Jan. 23, 2009, pp. 448-466.
Lee, et al., "Recent Approaches to Dialog Management for Spoken Dialog Systems", In Journal of Computing Science and Engineering, vol. 4, No. 1, Mar. 18, 2010, 22 Pages.
Lei, et al., "Accurate and Compact Large Vocabulary Speech Recognition on Mobile Devices", In Proceedings of 14th Annual Conference of the International Speech Communication Association, vol. 1, Aug. 25, 2013, 4 Pages.
Liu, et al., "Representation Learning using Multi-Task Deep Neural Networks for Semantic Classification and Information Retrieval", In the proceedings of the Conference of the North American Chapter of the Association for Computational Linguistics: Human Language Technologies, May 31, 2015, 10 Pages.
Maas, et al., "Increasing Deep Neural Network Acoustic Model Size for Large Vocabulary Continuous Speech Recognition", In Proceedings of the Computing Research Repository, Jun. 30, 2014, 5 Pages.
Oh, et al., "Stochastic Natural Language Generation for Spoken Dialog Systems", In Proceedings of Computer Speech and Language, vol. 16, Jan. 1, 2012, 21 Pages.
Pacharawongsakda, et al., "Multi-Label Classification Using Dependent and Independent Dual Space Reduction", The computer Journal, Feb. 18, 2013, pp. 1113-1135.
Pan, et al., "A Survey on Transfer Learning", Published in Journal of IEEE Transactions on Knowledge and Data Engineering, vol. 22, Issue: 10, Oct. 2010, pp. 1345-1359.
"International Search Report & Written Opinion Issued in PCT Application No. PCT/CN2014/086397", dated May 27, 2015, 11 Pages.
"International Preliminary Report on Patentability Issued in PCT Application No. PCT/US2014/013469", dated Jul. 20, 2015, 6 Pages.
"International Search Report and Written Opinion Issued in PCT Patent Application No. PCT/US2014/013469", dated Jan. 21, 2015, 10 Pages.
"Second Written Opinion Issued in PCT Application No. PCT/US2014/013469", dated May 29, 2015, 6 Pages.
"International Preliminary Report on Patentability Issued in PCT Application No. PCT/US2016/040925", dated Sep. 15, 2017, 8 Pages.
"International Search Report and Written Opinion Issued in PCT Application No. PCT/US2016/040925", dated Oct. 13, 2016, 13 Pages.
"Second Written Opinion Issued in PCT Application No. PCT/US2016/040925", dated Jun. 14, 2017, 7 Pages.
"Non Final Office Action Issued in U.S. Appl. No. 14/792,269", dated Feb. 4, 2019, 17 Pages.
"Second Office Action Issued in Chinese Patent Application No. 201480068343.X", dated Apr. 10, 2019, 11 Pages.
Porzel, et al., "Towards Context-adaptive Natural Language Processing Systems", In Proceedings of Computational Linguistics for the New Millenium: Divergence or Synergy, May 2002, 12 Pages.
Ries, et al., "Dialogue Act Modeling for Automatic Tagging and Recognition of Conversational Speech", In Proceedings of Association for Computational Linguistics, vol. 26, Issue 3, Sep. 2000, 35 Pages.
Rumelhart, et al., "Learning representations by back-propagating errors", In Journal of Nature, vol. 323, Oct. 9, 1986, pp. 533-536.
Sainath, et al., "Low-Rank Matrix Factorization for Deep Neural Network Training with High-Dimensional Output Targets", In Proceedings of the IEEE International Conference on Acoustics, Speech and Signal Processing, May 26, 2013, pp. 6655-6659.
Schwenk, et al., "Boosting Neural Networks", In Proceedings of Neural Computation, vol. 12, Issue 8, Aug. 2000, pp. 1869-1887.
Seide, et al., "Conversational Speech Transcription Using Context-Dependent Deep Neural Networks", In Proceedings of Interspeech, Aug. 2011, pp. 437-440.
Su, et al., "Error Back Propagation for Sequence Training of Context-Dependent Deep Networks for Conversational Speech Transcription", In Proceedings of the IEEE International Conference on Acoustics, Speech and Signal Processing, May 26, 2013, pp. 6664-6668.
Sun, et al., "Canonical Correlation Analysis for Multi-Label Classification: A Least Squares Formulation, Extensions and Analysis", In Proceedings of IEEE Transactions of Pattern Analysis and Machine Intelligence, vol. 33, Issue 1., Aug. 26, 2010, 13 Pages.
Tao, et al., "Exploring Shared Subspace and Joint Sparsity for Canonical Correlation Analysis", In Proceedings of 23rd ACM International Conference on Conference on Information and Knowledge Management, Nov. 3, 2014, 5 Pages.
Vanhoucke, et al., "Improving the Speed of Neural Networks on CPUs", In Proceedings of the NIPS Workshop on Deep Learning and Unsupervised Feature Learning, vol. 1, Dec. 16, 2011, 8 Pages.
Vanhoucke, et al., "Multiframe Deep Neural Networks for Acoustic Modeling", In Proceedings of IEEE International Conference on Acoustics, Speech and Signal Processing (ICASSP), May 26, 2013, 4 Pages.
Vu, et al., "Multilingual Deep Neural Network Based Acoustic Modeling for Rapid Language Adaptation", In Proceedings of IEEE International Conference on Acoustics, Speech and Signal Processing (ICASSP), May 4, 2014, 5 Pages.
Wang, et al., "Heterogeneous Domain Adaption Using Manifold Alignment", In Proceedings of International Joint Conference on Artificial Intelligence, Jul. 16, 2011, 6 Pages.
Yeh, et al., "Heterogeneous Domain Adaption and Classification by Exploiting the Correlation Subspace.", In Proceedings of IEEE Transactions on Image Processing, vol. 23, Issue 5, May, 2014, 10 Pages.
Young, et al., "Tree-based State Tying for High Accuracy Acoustic Modelling", In Proceedings of the workshop on Human Language Technology, Mar. 8, 1994, pp. 307-312.
Yu, et al., "Roles of pre-training and fine-tuning in context-dependent DBN-HMMs for real-world speech recognition", In Proceedings of NIPS 2010 Workshop on Deep Learning and Unsupervised Feature Learning, Dec. 1, 2010, 8 Pages.
Zhou, et al., "A Cluster-Based Multiple Deep Neural Networks Method for Large Vocabulary Continuous Speech Recognition", In Proceedings of IEEE International Conference on Acoustics, Speech and Signal Processing (ICASSP), May 26, 2013, pp. 6650-6654.

(56) References Cited

OTHER PUBLICATIONS

"Final Office Action Issued in U.S. Appl. No. 14/792,269", dated Jun. 6, 2019, 10 Pages.
"Office Action Issued in European Patent Application No. 16742099.1", dated May 21, 2019, 07 Pages.
"Office Action Issued in Japanese Patent Application No. 2017-513728", dated Mar. 29, 2019, 6 Pages.
"Non-Final Office Action Issued in U.S. Appl. No. 14/792,269", dated Apr. 13, 2020, 16 Pages.
"Final Office Action Issued in U.S. Appl. No. 14/792,269", dated Aug. 21, 2020, 18 Pages.
Pan, et al., "Cross-Domain Sentiment Classification via Spectral Feature Alignment", In Proceedings of the 19th International Conference on World Wide Web, Apr. 26, 2010, pp. 751-760.
"Summons to Attend Oral Proceedings Issued in European Patent Application No. 16742099.1", dated Aug. 27, 2020, 8 Pages.

\* cited by examiner

DOMAIN ADAPTATION IN SPEECH RECOGNITION VIA TEACHER-STUDENT LEARNING

BACKGROUND

Systems that use speech recognition often require large datasets of well-maintained and annotated utterances to train the models used by those systems to accurately identify the words that users are attempting to say to those systems. Gathering such large datasets is often time consuming, and maintaining such datasets requires large expenditures of computer storage space. Individual systems are frequently trained for a single domain (such as a given user's voice, a given compression codec, a given microphone setup, etc.), and new models need to be trained for each domain to accurately interpret utterances received within that domain, requiring the gathering and storage of ever more and ever larger datasets to accurately create models for use in identifying speech from utterances in different domains.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable storage devices embodying instructions for providing domain adaptation for speech recognition via student-teacher training are provided herein. To recognize words received in a second domain of speech, a first speech recognition model that has been trained to recognize speech in a first domain is used as a teacher to train a second model acting as a student. The student model is based on the teacher model and is trained in parallel with the operation of the teacher model. As the teacher model receives inputs that conform to the first domain, the student model is fed (in parallel) equivalent inputs that conform to the second domain. The detection results of each model are then compared against one another and adjustments are made to the student model in light of differences in detected phonemes. The data in the second domain are not required to be labeled or transcribed for the supervised training of the student model according to the present disclosure; supervision is provided by the parallel processing of data by the teacher model. As will be appreciated, this removes the onus of transcribing and maintaining large datasets for various domains, and allows for the creation of datasets for new domains based on modifications of existing datasets for other domains.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
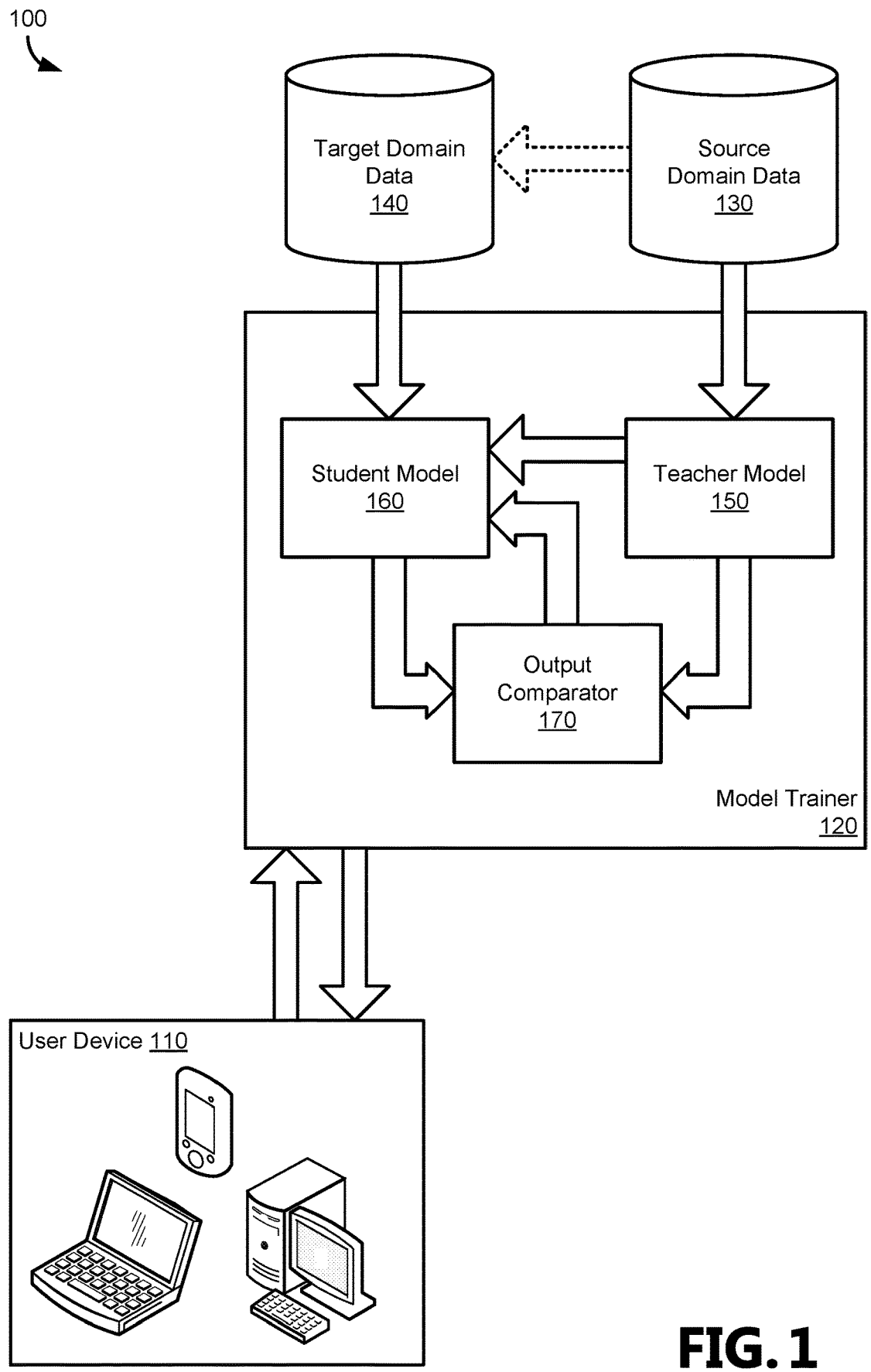
FIG. 1 illustrates an example operating environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

As used in the present disclosure, some examples are given using the International Phonetic Alphabet (IPA), which are distinguished from the rest of the text via inclusion in curled brackets "{"and"}". For example, the word 'hello' may be presented in a variety of ways depending on the speaker's pronunciation via IPA, including, but not limited to {həˈloʊ}, {həˈləʊ}, and {həˈlɔʊ}. Although examples are given herein primarily in terms of whole words, this is for ease of written explanation—it will be appreciated that a speech recognition model is operable to recognize individual phonemes or senones, which are the units of language or sound that form words.

Systems, methods, and computer readable storage devices embodying instructions for providing domain adaptation for speech recognition via student-teacher training are provided herein. To recognize words received in a second domain of speech, a first speech recognition model that has been trained to recognize speech in a first domain is used as a teacher to train a second model acting as a student. The student model is based on the teacher model and is trained in parallel with the operation of the teacher model. As the teacher model receives inputs that conform to the first domain, the student model is fed (in parallel) equivalent inputs that conform to the second domain. The detection results of each model are then compared against one another and adjustments are made to the student model in light of differences in detected words.

The data in the second domain are not required to be labeled or transcribed for the supervised training of the student model according to the present disclosure; supervision is provided by the parallel processing of data by the teacher model. As will be appreciated, this removes the onus of transcribing and maintaining large datasets for various domains, and allows for the creation of datasets for new domains based on modifications of existing datasets for other domains.

For example, a dataset of utterances from adults (a first domain) may be frequency shifted to produce a dataset that approximates utterances from children (a second domain). In another example, a dataset of utterances received in a quiet room (a first domain) may have noise added to the utterances (e.g., random noise, traffic, background utterances) to produce a dataset that approximates utterances received in a noisy environment (a second domain). In a further example, a dataset of utterances stored according to a first compression codec (a first domain) may be transformed to a second codec to produce a second dataset (a second domain). In another example, distance between a microphone and a speaker may be simulated to produce a dataset of utterances for a speaker who is further from a microphone (a second domain) from a dataset of utterances of a speaker who is closer to a microphone (a first domain), for example, via volume changes, echoes addition/suppression, frequency range blocking/amplification, etc. In a further example, microphone limitations may be simulated to produce a domain for a less capable microphone (a second domain) from a domain gathered from a more capable microphone (a first domain) to simulate narrow-band utterances based on wide-band utterances. One of ordinary skill in the art will appreciate other modifications of a dataset to produce two separate domains are possible.

FIG. 1 illustrates an example operating environment 100 in which the present disclosure may be practiced. As illustrated, a user device 110 is in communication with a model trainer 120 to develop speech recognition models for use in particular domains. The model trainer 120 receives source domain data 130 and a target domain data 140 of various utterances from different domains that are fed in parallel to a teacher model 150 and a student model 160 respectively. The results from the speech recognition models 150, 160 are compared by an output comparator 170, and the differences between the two result sets are fed back into the student model 160 to update the student model 160.

The user device 110 and model trainer 120 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 4-6.

In various aspects, the source domain data 130 are stored on the user device 110, within the model trainer 120, or in a database or other computing accessible by the model trainer 120. In some aspects, the target domain data 140 are part of a pre-existing dataset of a different domain than the source domain data 130 having parallel content. As used herein, a "domain" refers to a set of utterances having similar characteristics that a speech recognition model is trained to recognize words in. For example, a first domain may have a first Signal-to-Noise Ratio (SNR) and a second domain may have a second SNR. In another example, a first domain will have a first mean voice frequency (e.g., utterances from adult males), a second domain will have a second mean voice frequency (e.g., utterances from adult females), and a third domain will have a third mean voice frequency (e.g., utterances from children). As will be appreciated, individual utterances may belong to several datasets (e.g., an utterance from an adult male having a first SNR), and may be designated as such via various tags or labels in a database maintaining the datasets. In other aspects, such as when a dataset for a given domain does not exist, is of insufficient size, or is otherwise not accessible by the model trainer 120, the target domain data 140 are created or supplemented from the source domain data 130 to simulate conformance with the characteristics that define the target domain, such as is discussed in greater detail in regard to FIG. 3.

The source domain data 130 are fed to the teacher model 150 and the target domain data 140 are fed to the student model 160 to train the student model 160 to evaluate utterances in the target domain accurately. At initiation, the teacher model 150 is fully trained for the source domain, and is cloned (i.e., copied as a new instance) to create the initial student model 160.

In one aspect, the teacher model 150 is a speech recognition model trained for a baseline domain and the student model 160 is a user-specific domain and the student model 160 is provided to the user device 110 for the user associated with that user-specific domain. For example, a user X who desires speech recognition on an associated user device 110 will contact the model trainer 120, select a baseline speech recognition model that has already been trained for a given language, dialect, or accent and provide utterances (the target domain data 140) to develop a student model 160 that is specific to user X's particular speech patterns from the baseline model (teacher model 150). The model developed may then be provided to the user device 110 or retained for later use as another teacher model 150. Similarly, the input utterances may be discarded or retained for later use in training.

In another aspect, the teacher model 150 is a speech recognition model trained for a given domain available for use by several user devices 110 and the student model 160 is a speech recognition model trained for a different domain that is also available for use by several user devices 110. For example, if a new voice compression codec is developed, a new speech recognition model may be trained for the dataset of utterances compressed by that codec (target domain data 140) so that user devices 110 that employ the new codec may accurately recognize words in utterances compressed thereby. User devices 110 may then download a selected student model 160 or have new student models 160 uploaded thereto.

The student model 160 is trained under the supervision of the teacher model 150, wherein each model 150, 160 receives utterances in their respective domains in parallel. Parallel utterances contain the same words, but have different audio features. For example, a child saying a given word will generally use a higher mean vocal frequency than an adult saying the same word, due to adults generally having deeper voices than children. In another example, a first user having a first accent (first domain) may pronounce the word "hello" as {həˈloʊ} while a second user having a second accent (second domain) may pronounce the word "hello" as {həˈloʊ}. The parallel utterances are received by the respective teacher model 150 or student model 160, which may each correctly or incorrectly recognize the utterance as containing a given word (or a frame of the utterance containing a given phoneme or senone).

The outputs from the speech recognition models 150, 160 are compared by the output comparator 170, and the differences or similarities in recognition of the words/phonemes/ senones in the utterance are fed back into the student model 160 to update the student model 160 according to one of various machine learning techniques or schemes to more accurately identify speech in accord with the outputs from the teacher model 150.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs (e.g., sample A, sample B, sample C) to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

In the current disclosure, the training dataset inputs are provided from target domain data 140 to train the student model 160 during its learning phase, and the parallel source domain data 130 are analyzed by the teacher model 150 to provide supervised learning.

Models may be run against a training dataset for several epochs, in which the training dataset is repeatedly fed into the model to refine its results. For example, in a supervised learning phase, a model is developed to predict the output for a given set of inputs, and is evaluated over several epochs to more reliably provide the output that is specified as corresponding the given input for the greatest number of inputs for the training dataset. In another example, for an unsupervised learning phase, a model is developed to cluster the dataset into n groups, and is evaluated over several epochs in how consistently it places a given input into a given group and how reliably it produces the n desired clusters across each epoch.

Once an epoch is run, the models are evaluated and the values of their variables are adjusted to attempt to better refine the model. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, etc.

The model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. Models that are finalized are evaluated against testing criteria. In a first example, a testing dataset that includes known outputs for its inputs is fed into the finalized models to determine an accuracy of the model in handling data that is has not been trained on. In a second example, a false positive rate, false negative rate may be used to evaluate the models after finalization. In a third example, a delineation between clusterings is used to select a model that produces the clearest bounds for its clusters of data.

While the user device 110, model trainer 120, and data sources are shown remotely from one another for illustrative purposes, it should be noted that several configurations of one or more of these devices hosted locally to another illustrated device are possible, and each illustrated device may represent multiple instances of that device. Various servers and intermediaries familiar to those of ordinary skill in the art may lie between the component systems illustrated in FIG. 1 to route the communications between those systems, which are not illustrated so as not to distract from the novel aspects of the present disclosure.

The speech recognition models 150, 160 receive utterances from the user device 110 and, during a training phase, from the domain data 130, 140 to identify the various phonemes and senones (including silences) present in the utterance, thus producing phonetic representations of the utterance at a frame level. In various aspects, a frame is a predefined length of time in an audio signal, such as, for example, 5, 10, 15, or n ms. The recognized phonemes are used in various aspects to determine what the speaker is saying in an utterance, for example, to determine whether a key phrase is present, to identify the content of a command or query, etc.

In some aspects, the phonetic representations for the frames are produced from posterior features $\gamma_f$ for each frame f that provide statistical likelihoods that the frame f contains various phonemes/senones. The posteriors are developed for the student model 160 during the training phase from initial weights that are supplied from the teacher model 150.

The student model 160 includes or is trained by a Neural Network (e.g., deep learning, deep convolutional, or recurrent neural networks), which comprises a series of "neurons," such as Long Short Term Memory (LSTM) nodes, arranged into a network. A neuron is an architecture used in data processing and artificial intelligence, particularly machine learning, that includes memory that may determine when to "remember" and when to "forget" values held in that memory based on the weights of inputs provided to the given neuron. Each of the neurons used herein are configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance are related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

As discussed herein, for one to F frames in an utterance, the probabilities that a given frame f (where $f \in 1-F$) includes a given senone/phoneme are referred to as a posterior distributions. The posterior distribution of the teacher model 150 is referred to as $P_T(s|x_T)$ and the posterior distribution of the student model 160 is referred to as $P_S(s|x_S)$ where $x_T$ and $x_S$ represent the parallel inputs from different domains to the teacher model 150 and student model 160 respectively and s represents the senones (or phonemes) that have been analyzed. Using the above definitions, a divergence score of the Kullback-Leibler divergence between the two speech recognition models determined by the output comparator 170 may be calculated according to FORMULA 1, where i represents a detection index detailing a given senone/phoneme of the senones/phonemes that the models are capable of detecting and distinguishing.

$$\Sigma_f \Sigma_i P_T(s_i|x_{T,f}) \cdot \log(P_T(s_i|x_{T,f}) \div P_S(s_i|x_{S,f})) \quad \text{FORMULA 1:}$$

Over successive epochs of training the student model 160, the weights applied to various inputs are adjusted to minimize the divergence score between the two speech recognition models 150, 160. As will be appreciated, only the parameters of the student model 160 are adjusted during training. Accordingly, minimizing the Kullback-Liebler divergence score is equivalent to minimizing (according to absolute value) the difference detailed in FORMULA 2 because the element of $P_T(s_i|x_{T,f}) \cdot \log(P_T(s_i|x_{T,f}))$ has no impact on optimization of the student model 160.

$$-\Sigma_f \Sigma_i P_T(s_i|x_{T,f}) \cdot \log(P_S(s_i|x_{S,f})) \quad \text{FORMULA 2:}$$

In the above FORMULA 1 and FORMULA 2, the element of $P_T(s_i|x_{T,f})$ provides a supervisory signal for training the student model 160 when the teacher model 150 and the student model 160 are provided parallel inputs $x_T$ and $x_S$ from their respective domains. As will be appreciated, because the inputs are provided in parallel, no labeling of the inputs is required (i.e., neither the source domain data 130 nor the target domain data 140 need to be labeled; both may be un-transcribed) and the training of the student model 160 may make use of an unlimited amount of training data. Because no labels are needed, for either of the domains when simulating the target domain data 140, huge amounts of parallel data can be generated from existing source domain data 130, which are used to make the behavior of the student model 160 for the target domain converge to that of the teacher model 150 for the source domain for which it was trained.

In some aspects, the corpus of inputs for the target domain data 140 are generated from the corpus of inputs of the source domain data 130. Various signals may be overlaid to the source domain data 130 to produce a "noisy" target domain data 140, and volume changes, echo effects, compression schemes, etc. may also be applied to affect a different domain of utterances. Another transformation of the source domain data 130 into the target domain data 140 includes an adult/child domain swap. Obtaining a parallel corpus of adult and child utterances is challenging, due to privacy laws relating to gathering data from children versus adults, different rates of speech found in different individuals affecting utterance synchronization, etc., and therefore the source domain data 130 may be frequency warped to produce a training data set for the target domain data 140 that simulate childlike utterances. For example a bilinear transform as detailed in FORMULA 3 may be applied to warp adult speech spectrums to reconstruct the utterance with a higher pitch or average frequency of speech, where ω denotes the frequency and α denotes a warping factor. As will be appreciated, a static value for the warping factor α (e.g., 0.1) may be used, or vowel segments of known target domain data 140 may be calculated used to adjust the warping factor α based on the source domain data 130.

$$\omega_{S,f} = \omega_{T,f} + 2 \cdot \arctan[-\alpha \cdot \sin(\omega_{T,f}) \div (1 + \alpha \cdot \cos(\omega_{T,f}))] \quad \text{FORMULA 3:}$$

Figure 2:
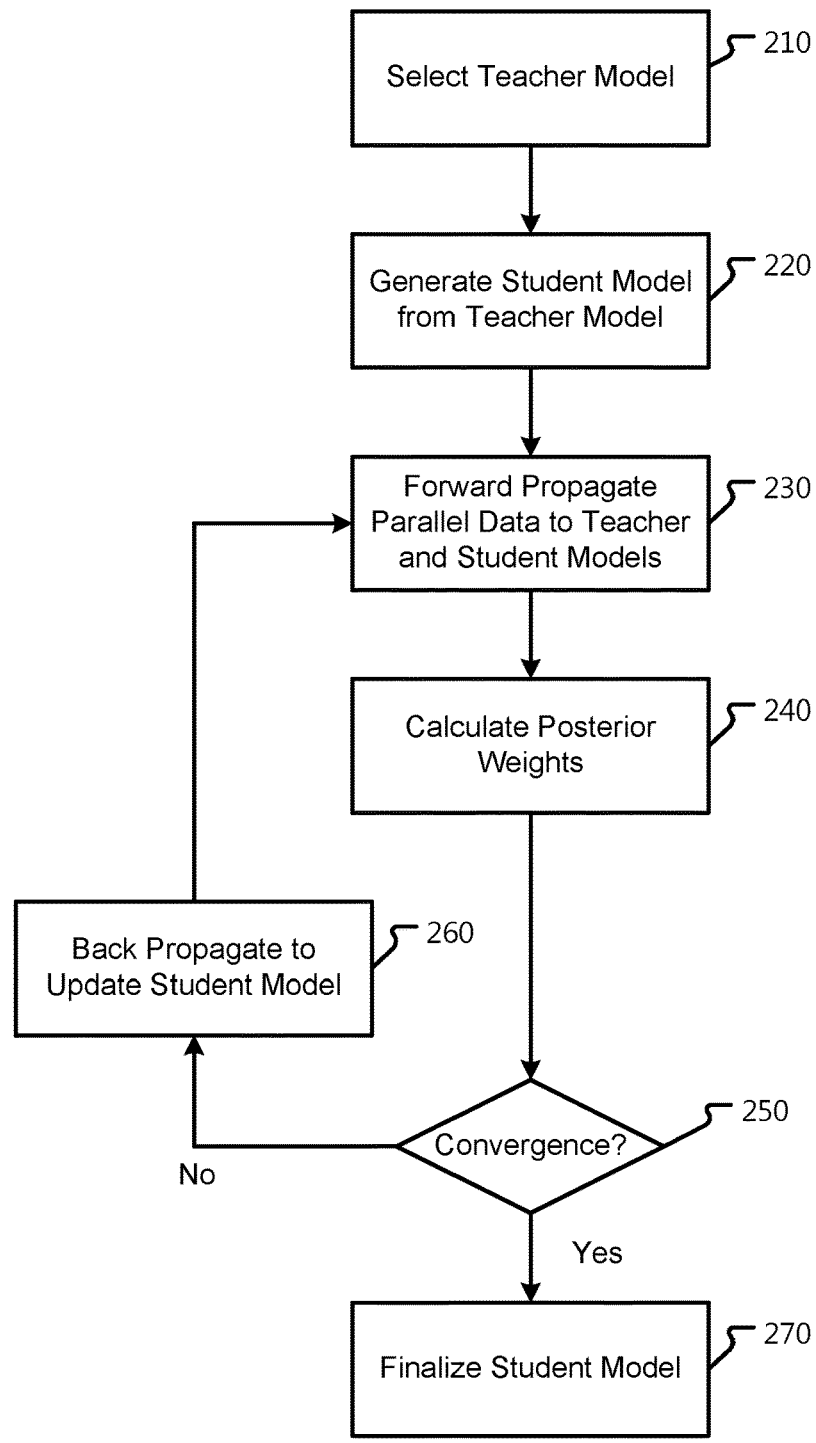
FIG. 2 is a flowchart showing general stages involved in an example method for student/teacher training for speech recognition.

FIG. 2 is a flowchart showing general stages involved in an example method 200 for student/teacher training for speech recognition. Method 200 begins with OPERATION 210, where an already trained teacher model 150 associated with a dataset of source domain data 130 is selected. In various aspects, the teacher model 150 is selected based on a language, a dialect, an accent pattern, or the like.

Proceeding to OPERATION 220, an initial student model 160 is generated based on the teacher model 150. In various aspects, the initial student model 160 is a clone of the teacher model 150, wherein the weightings, Neural Networks are set exactly like those of the teacher model 150. As will be appreciated, during the course of method 200, those weightings, Neural Networks of the student model 160 will be modified from their initial values or layouts to more accurately recognize speech in the domain for which the student model 160 is adapted by minimizing the divergence score calculated between the posteriors generated by the teacher model 150 and the student model 160.

The source domain data 130 and the target domain data 140 are forward propagated to the teacher model 150 and the student model 160, respectively, at OPERATION 230. In some aspects, all of the target domain data 140 and associated source domain data 130 are forward propagated, while in other aspects a sub-set or batch of the target domain data 140 and associated source domain data 130 are forward propagated. In successive iterations of training the student model 160 the successive parallel batches will be fed to the teacher model 150 and the student model 160 to produce successive posteriors, which will be compared again against one another until a maximum number of epochs is reached, the divergence score satisfies a convergence threshold, divergence plateaus, or training is manually stopped.

The speech recognition models 150, 160 are fed the data in parallel from their associated domains to recognize sounds in the data as components of speech and/or as individual words. These components are calculated as posteriors at OPERATION 240, in which the probabilities that a given frame of an utterance contains a given senone/phoneme are calculated, including probabilities that a given frame includes silences or otherwise lacks human speech. In various aspects, a highest-probability senone/phoneme for a given frame is indicated or is provided as the only output for a given frame by each model, while in other aspects all of the probabilities for the potential senones/phonemes are output by the models.

Proceeding to DECISION 250, it is determined whether the behavior of the student model 160 converges with the behavior of the teacher model 150. In various aspects, the convergence is calculated as a Kullback-Leibler divergence as shown in FORMULA 1, as a modified Kullback-Leibler divergence as shown in FORMULA 2, or as another divergence score. When the divergence converges below a convergence threshold, it indicates that the student model 160 is able to recognize speech in its given domain almost as well as the teacher model 150 is able to recognize speech in its domain. When the divergence score does not satisfy the convergence threshold, it indicates that the student model 160 has not yet converged with the teacher model 150, and will require adjustment to its parameters. As will be appreciated, the student model 160 may be more or less accurate than the teacher model 150 in some cases for accurately recognizing speech, but is judged based on the similarity of its results to the results of the teacher model 150. As will also be appreciated, convergence may also occur when a maximum number of training rounds have occurred, a divergence plateau is reached, or when a user manually terminates training early.

In response to determining that the student model 160 has not converged relative to the teacher model 150, method 200 proceeds to OPERATION 260. At OPERATION 260, the results from the teacher model 150 and the student model 160 are back propagated to the student model 160, to thereby update the parameters of the student model 160 in light of the divergent results. As will be appreciated, various machine learning techniques may be used to update the student model 160 in light of the results. Once the student model is updated, method 200 returns to OPERATION 230 to feed the teacher model 150 and the updated student model 160 parallel data from their associated domains. As will be appreciated, subsequent executions of OPERATION 230 may use the same or different (successive) data from the source domain data 130 and the target domain data 140.

In response to determining that the student model 160 has converged relative to the teacher model 150, method 200 proceeds to OPERATION 270, where the student model 160 is finalized. Finalizing the student model 160 locks in the values (weights and thresholds) and structures (e.g., node connections in a neural network) of the speech recognition model. Once finalized, the student model 160 may be transmitted to a user device 110 or third-party speech recognition service for speech recognition thereon, be used as a teacher model 150 for training a new student model 160, or undergo further testing or analysis.

Method 200 then concludes.

Figure 3:
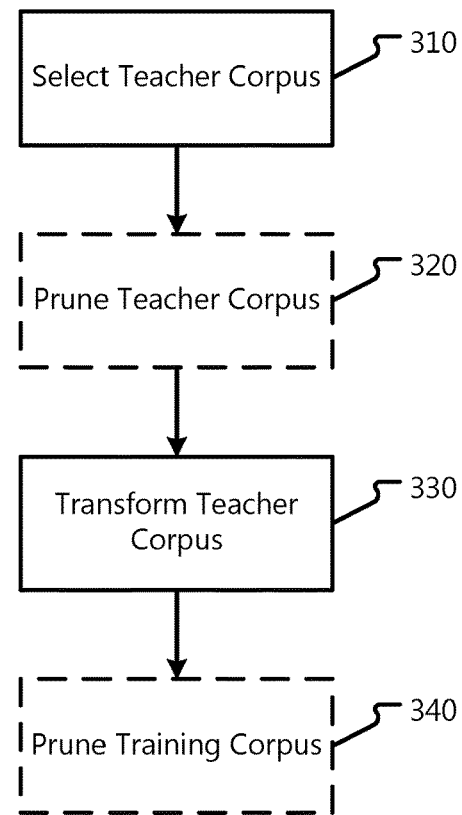
FIG. 3 is a flowchart showing general stages involved in an example method for domain building.

FIG. 3 is a flowchart showing general stages involved in an example method 300 for domain building, in which utterances in a source domain are used develop a target domain for training a student model 160 adapted to recognize speech within that target domain. Method 300 begins with OPERATION 310, where a teacher corpus of utterances is selected for use as a base for the target corpus of utterances.

At optional OPERATION 320 the corpus of source domain data 130 received in OPERATION 310 is pruned to remove entries from consideration as part of the corpus of target domain data 140. For example, utterances in the source domain that are not expected to transform well from the source domain into the target domain; that have a particular length, volume, SNR, or other feature; or include a particular label may be removed from the source domain data 130 so that target domain data 140 for those utterances are not created.

Proceeding to OPERATION 330, the corpus of source domain data 130 received in OPERATION 310 is transformed to produce the corpus of target domain data 140. In some aspects, the target domain data 140 are retained for later use or are discarded after a student model 160 is trained thereby.

In various aspects, additional signals (white noise, pre-recorded background conversations/traffic noise, etc.), are added to the utterances of the source domain data 130 to transform into the target domain data 140. In other aspects, features of the utterances of the source domain data 130 are modified to transform into the target domain data 140, for example, to add an echo effect, reduce or increase volume, add or change a data compression effect, clip lengths of the utterances, induce or increase pauses between words in the utterances, clip or remove frequency ranges from the utterances (e.g. apply a high-, low-, or band-pass filter), etc. In a further aspect, the utterances of the source domain data 130 are transformed into the target domain data 140 via frequency warping, such as is shown, for example, in FORMULA 3 above.

The domain definition for the target domain specifies one or more features that the utterances of the target domain will have. In some aspects one or more of an SNR, a codec by which the utterances are encoded, a frequency band of the utterances (or that the model is trained on), a field depth (indicating a distance relative to a microphone) by which the utterances are collected, a volume level for the utterances (average, maximum, minimum, etc.), an average pitch of the utterances, etc. As will be appreciated, the target domain definition may specify a given range for its definitional values (e.g., between X-Y dB, X-Y Hz) or an offset from the source domain (e.g., X dB louder/quieter, X Hz higher/lower pitch). As will also be appreciated, the simulation of a second domain based on a first domain enables student models 160 to be trained in conjunction with the teacher model 150 in an almost limitless number of domains with un-transcribed data. For example, student-teacher learning may be applied to: far field speech recognition by providing close/far talk speech pairs to the models; noisy speech recognition by providing clean/noisy speech pairs to the models; children's speech recognition by providing adult/child speech pairs to the models; narrow-band speech recognition by providing wide/narrow speech pairs to the models; and audio-codec speech recognition by providing original/encoded speech pairs to the models.

Method 300 optionally proceeds to OPERATION 340, where the training data, including the source domain data 130 and the associated target domain data 140, are pruned according the domain characteristics of the target domain. The transformed utterances that do not meet the definition for the target domain are pruned from the target domain data 140 and the utterances from which they were transformed are pruned from the source domain data 130. For example, if a target domain of utterances of simulated children's voices is transformed from a source domain of utterances from adults by raising the pitch of the adults' utterances, some of the simulated utterances may have a pitch outside the defined frequency ranges for the simulated children's utterances. Some of the adult voices in the above example may have been too low to bring into the frequency range dictated by the target domain. Similarly, in the above example, some of the adult voices may already have been high enough so that when frequency warped, those voices will be too high for the frequency range dictated by the target domain. The transformed data are removed from the student corpus and their parallels in the teacher corpus are similarly removed from the teacher corpus.

Method 300 then concludes.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
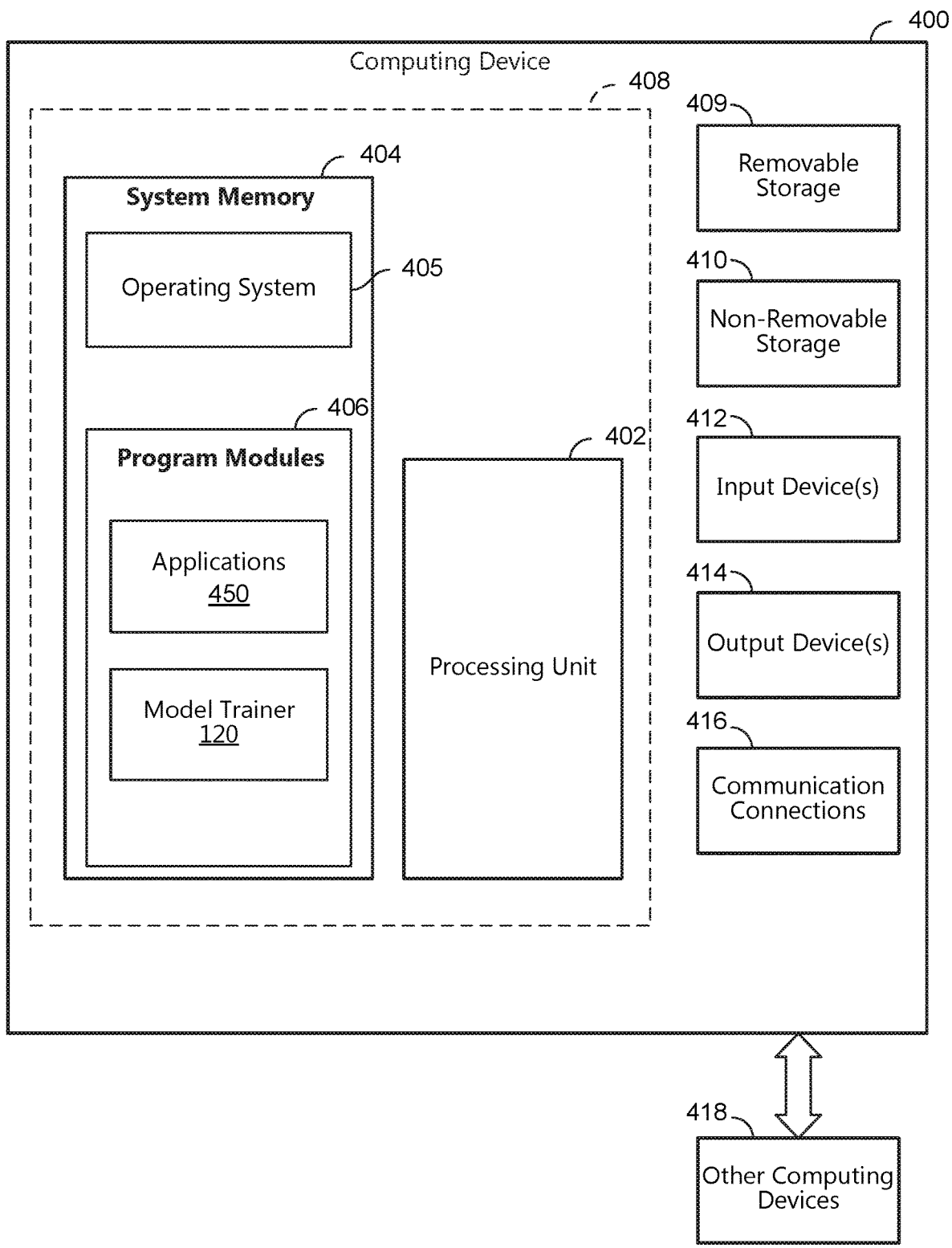
FIG. 4 is a block diagram illustrating example physical components of a computing device.
Figure 5A:
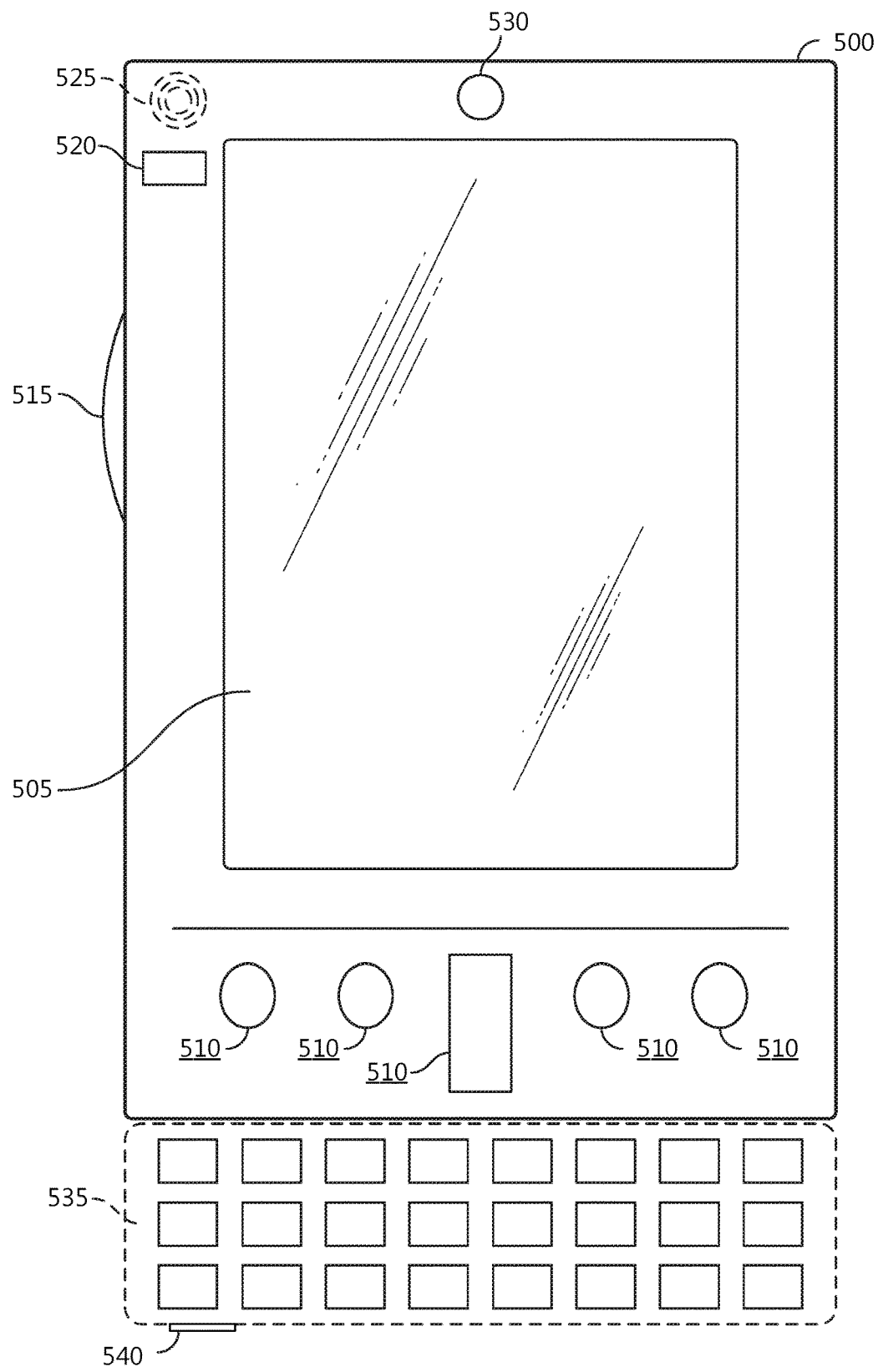
FIGS. 5A and 5B are block diagrams of a mobile computing device.
Figure 5B:
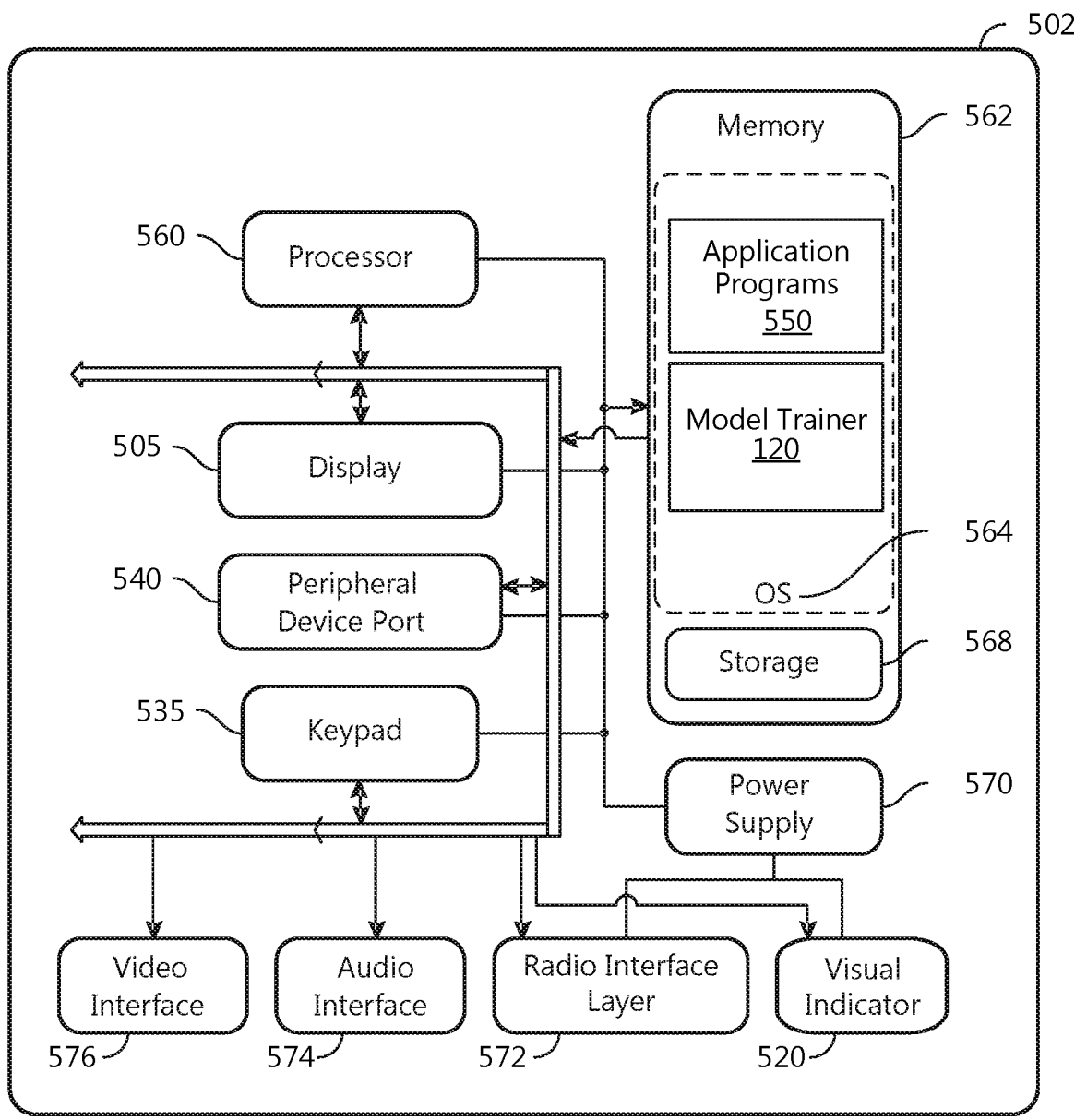
Figure 6:
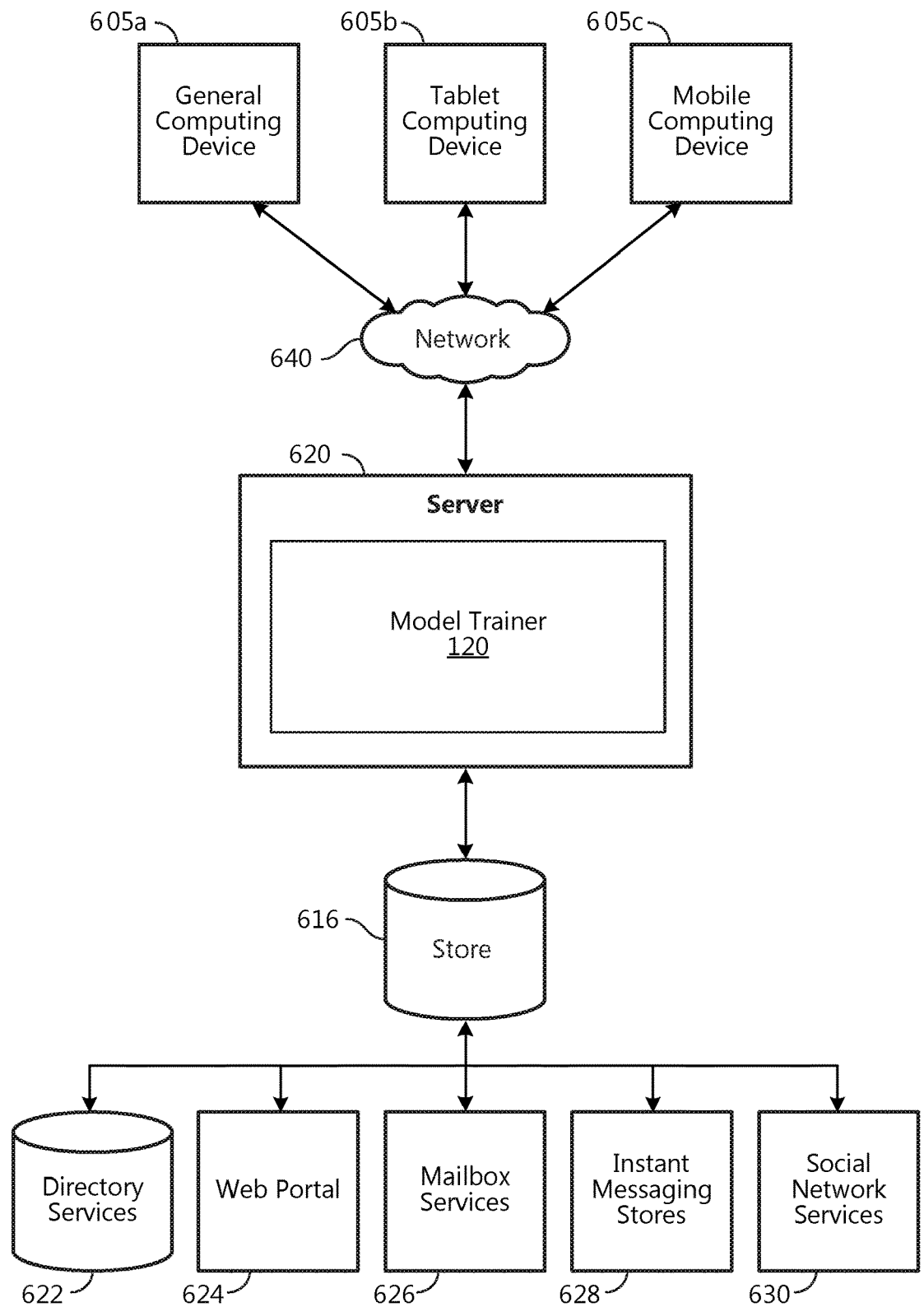
FIG. 6 is a block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes model trainer 120. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., model trainer 120) perform processes including, but not limited to, one or more of the stages of the methods 200 and 300 illustrated in FIGS. 2 and 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media are part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, model trainer 120 and/or one or more speech recognition models 150, 160 are loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for speech recognition as described above. Content developed, interacted with, or edited in association with the model trainer 120 is enabled to be stored in different communication channels or other storage types. For example, various documents may be stored using a directory service 622, a web portal 624, a mailbox service 626, an instant messaging store 628, or a social networking site 630. The model trainer 120 is operative to use any of these types of systems or the like for developing student models 160, as described herein. According to an aspect, a server 620 provides the model trainer 120 to clients 605*a,b,c*. As one example, the server 620 is a web server providing the model trainer 120 over the web. The server 620 provides the model trainer 120 over the web to clients 605 through a network 640. By way of example, the client computing device is implemented and embodied in a personal computer 605*a*, a tablet computing device 605*b* or a mobile computing device 605*c* (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Notwithstanding the appended claims, the disclosure is also defined by the following clauses:

1. A system providing for adaption of speech recognition models for speech recognition in new domains, comprising:
    a processor; and
    a memory storage device including instructions that when executed by the processor enable the system to:
        select a teacher model configured for speech recognition of utterances in a source domain;
        produce a student model based on the teacher model for speech recognition of utterances in a target domain;
        provide source domain utterances to the teacher model to produce teacher posteriors for the source domain utterances;
        provide, in parallel to providing the source domain utterances, target domain utterances to the student model to produce student posteriors for the target domain utterances;
        determine whether student posteriors converge with the teacher posteriors;
        in response to determining that the student posteriors and the teacher posteriors converge, finalize the student model for use in speech recognition in the target domain; and
        in response to determining that the that the student posteriors and the teacher posteriors do not converge, update parameters of the student model based on divergences in the student posteriors and the teacher posteriors.

2. The system of clause 1, 3, 4, 5, 6, or 7, wherein the teacher model is selected based on at least one of:
    a selected language;
    a selected dialect; and
    a selected accent.

3. The system of clause 1, 2, 4, 5, 6, or 7, wherein the parameters of the student model are updated according to a back propagation of the student posteriors.

4. The system of clause 1, 2, 3, 5, 6, or 7, wherein providing target domain utterances in parallel with the source domain utterances the system is further operable to:
    receive a target domain definition specifying at least one of:
        a Signal to Noise Ratio;
        a codec by which the utterances are encoded;
        a frequency band for the utterances;
        a volume level; and
        an average speech frequency for the utterances;
    transform the source domain utterances according to the target domain definition to produce the target domain utterances that simulate utterances according to the target domain definition.

5. The system of clause 1, 2, 3, 4, 6, or 7, wherein the source domain utterances and the target domain utterances comprise un-transcribed data.

6. The system of clause 1, 2, 3, 4, 5, or 7, wherein in response to updating the student model, the system is further operable to:
    provide successive source domain utterances to the teacher model to produce successive teacher posteriors for the successive source domain utterances;
    provide, in parallel to providing the successive source domain utterances, successive target domain utterances to the updated student model to produce successive student posteriors for the successive target domain utterances;
    determine whether successive student posteriors converge with the successive teacher posteriors;
    in response to determining that the successive posteriors converge, finalize the updated student model for use in speech recognition in the target domain; and
    in response to determining that the successive posteriors do not converge, update parameters of the updated student model based on divergences in the successive posteriors.

7. The system of clause 1, 2, 3, 4, 5, or 6, wherein when updating the student model, the system is further operable to adjust parameters of the student model to minimize a divergence score between the student posteriors and the teacher posteriors.

8. A method for adaption of speech recognition models for speech recognition in new domains, comprising:
    receiving a selection of a first speech recognition model adapted for speech recognition of utterances in a first domain;
    cloning the first speech recognition model to thereby produce a second speech recognition model;
    providing a first dataset of utterances to the first speech recognition model and a second dataset of utterances to the second speech recognition model, wherein the first dataset includes utterances defined according to the first domain and the second dataset includes parallel utterances to those included in the first dataset that are defined according to a second domain;

determining whether posteriors produced by the second speech recognition model from the second dataset converge with posteriors produced by the first speech recognition model from the first dataset;

in response to determining that the posteriors converge, finalizing the second speech recognition model for use in speech recognition in the second domain; and in response to determining that the posteriors do not converge, updating parameters of the second speech recognition model based on the posteriors.

9. The method of clause 8, 10, 11, 12, 13, or 14, wherein the second dataset comprises the utterances of the first dataset transformed from the first domain into the second domain.

10. The method of clause 8, 9, 11, 12, 13, or 14, wherein transforming the utterances of the first dataset from the first domain into the second domain comprises at least one of:

overlaying a new signal to the utterances of the first dataset;

adjusting a parameter of the utterances of the first dataset; and frequency warping the utterances of the first dataset.

11. The method of clause 8, 9, 10, 12, 13, or 14 wherein the first speech recognition model provides a supervisory signal by which the second speech recognition model is updated.

12. The method of clause 8, 9, 10, 11, 13, or 14 wherein determining whether the posteriors produced by the second speech recognition model from the second dataset converge with the posteriors produced by the first speech recognition model from the first dataset further comprises:

calculating a divergence score between the posteriors produced by the second speech recognition model and the produced by the first speech recognition model;

comparing the divergence score to a convergence threshold;

in response to the divergence score satisfying the convergence threshold, determining that the posteriors converge; and in response to the divergence score not satisfying the convergence threshold, determining that the posteriors do not converge.

13. The method of clause 8, 9, 10, 11, 12, or 14, wherein the posteriors indicate probabilities of which senones are present in a given frame of a given utterance.

14. The method of clause 8, 9, 10, 11, 12, or 13 wherein the second domain is defined relative to the first domain as having at least one of:

a different Signal to Noise Ratio than the first domain;
a different encoding codec than the first domain;
a different frequency band of utterances than the first domain;
a different field depth for utterances than the first domain;
a different volume than the first domain; and
a different average pitch than the first domain.

15. A computer readable storage device including instructions that when executed by a processor provide for adaption of speech recognition models for speech recognition in new domains, comprising:

receiving a selection of a teacher model adapted for speech recognition of utterances in a source domain;

cloning the teacher model to produce a student model;

providing utterances according to the source domain to the teacher model in parallel to providing utterances according to a target domain to the student model;

determining whether posteriors produced by the student model from the target domain utterances converge with posteriors produced by the teacher model from the source domain utterances;

in response to determining that the posteriors converge, finalizing the student model for use in speech recognition in the target domain; and in response to determining that the posteriors do not converge, updating parameters of the student model based on the posteriors.

16. The computer readable storage device of clause 15, 17, 18, 19, or 20, wherein the target domain utterances comprise transformed utterances of the source dataset.

17. The computer readable storage device of clause 15, 16, 18, 19, or 20, wherein the target domain utterances comprise are transformed from the utterances of the source dataset comprises according to at least one of:

overlaying a new signal with the source domain utterances;

adjusting a parameter of the source domain utterances; and frequency warping the source domain utterances.

18. The computer readable storage device of clause 15, 16, 17, 19, or 20, wherein determining whether the posteriors produced by the student model converge with the posteriors produced by the teacher model further comprises:

calculating a divergence score between the posteriors produced by the student model and the produced by the teacher model;

comparing the divergence score to a convergence threshold;

in response to the divergence score satisfying the convergence threshold, determining that the posteriors converge; and in response to the divergence score not satisfying the convergence threshold, determining that the posteriors do not converge.

19. The computer readable storage device of clause 15, 16, 17, 18, or 20, wherein the posteriors indicate probabilities of which senones are present in a given frame of a given utterance.

20. The computer readable storage device of clause 15, 16, 17, 18, 19, or 20, wherein the target domain is defined as having at least one of:

a different Signal to Noise Ratio than the source domain;
a different codec by which utterances are encoded than the source domain;
a different frequency band for the utterances than the source domain;
a different field depth than the source domain;
a different volume than the source domain; and
a different average pitch than the source domain.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system providing for adaption of speech recognition models for speech recognition in new domains, comprising:
a processor; and
a memory storage device including instructions that when executed by the processor enable the system to:
select a teacher model configured for speech recognition of utterances in a source domain;
receive a target domain definition specifying at least one of:
a codec by which the utterances are encoded;
a field depth by which the utterances are collected; or
an average speech frequency for the utterances;
transform the source domain utterances according to the target domain definition to produce target domain utterances that simulate utterances according to the target domain definition;
provide the source domain utterances to the teacher model to produce teacher posteriors for the source domain utterances;
in parallel to providing the source domain utterances, provide the target domain utterances to a student model to produce student posteriors for the target domain utterances;
determine whether student posteriors converge with the teacher posteriors;
in response to determining that the student posteriors and the teacher posteriors converge, finalize the student model for use in speech recognition in the target domain; and
in response to determining that the student posteriors and the teacher posteriors do not converge, update parameters of the student model based on divergences in the student posteriors and the teacher posteriors.

2. The system of claim 1, wherein the teacher model is selected based on at least one of:
a selected language;
a selected dialect; and
a selected accent.

3. The system of claim 1, wherein the parameters of the student model are updated according to a back propagation of the student posteriors.

4. The system of claim 1, wherein the source domain utterances and the target domain utterances comprise un-transcribed data.

5. The system of claim 1, wherein in response to updating the student model, the system is further operable to:
provide successive source domain utterances to the teacher model to produce successive teacher posteriors for the successive source domain utterances;
provide, at the same time as providing the successive source domain utterances, successive target domain utterances to the updated student model to produce successive student posteriors for the successive target domain utterances;
determine whether successive student posteriors converge with the successive teacher posteriors;
in response to determining that the successive posteriors converge, finalize the updated student model for use in speech recognition in the target domain; and
in response to determining that the successive posteriors do not converge, update parameters of the updated student model based on divergences in the successive posteriors.

6. The system of claim 1, wherein when updating the student model, the system is further operable to adjust parameters of the student model to minimize a divergence score between the student posteriors and the teacher posteriors.

7. The system of claim 1, wherein the system is further operable to produce the student model based on the teacher model.

8. A method for adaption of speech recognition models for speech recognition in new domains, comprising:
receiving a selection of a first speech recognition model adapted for speech recognition of utterances in a first domain;
defining a second domain relative to the first domain as having at least one of:
a different encoding codec than the first domain;
a different field depth for utterances than the first domain; or
a different average pitch than the first domain;
in parallel to providing a first dataset of utterances to the first speech recognition model, providing a second dataset of utterances to a second speech recognition model,
wherein the first dataset includes utterances defined according to the first domain and the second dataset includes utterances defined according to the second domain;
determining whether posteriors produced by the second speech recognition model from the second dataset converge with posteriors produced by the first speech recognition model from the first dataset;
in response to determining that the posteriors converge, finalizing the second speech recognition model for use in speech recognition in the second domain; and
in response to determining that the posteriors do not converge, updating parameters of the second speech recognition model based on the posteriors.

9. The method of claim 8, wherein the second dataset comprises the utterances of the first dataset transformed from the first domain into the second domain.

10. The method of claim 9, wherein transforming the utterances of the first dataset from the first domain into the second domain comprises at least one of:
overlaying a new signal to the utterances of the first dataset;
adjusting a parameter of the utterances of the first dataset; and
frequency warping the utterances of the first dataset.

11. The method of claim 8, wherein the first speech recognition model provides a supervisory signal by which the second speech recognition model is updated.

12. The method of claim 8, wherein determining whether the posteriors produced by the second speech recognition model from the second dataset converge with the posteriors produced by the first speech recognition model from the first dataset further comprises:
calculating a divergence score between the posteriors produced by the second speech recognition model and the produced by the first speech recognition model;
comparing the divergence score to a convergence threshold;
in response to the divergence score satisfying the convergence threshold, determining that the posteriors converge; and
in response to the divergence score not satisfying the convergence threshold, determining that the posteriors do not converge.

13. The method of claim 8, wherein the posteriors indicate probabilities of which senones are present in a given frame of a given utterance.

14. The method of claim 8, further comprising cloning the first speech recognition model to produce the second speech recognition model.

15. A computer readable storage device including instructions that when executed by a processor provide for adaption of speech recognition models for speech recognition in new domains, comprising:
- receiving a selection of a teacher model adapted for speech recognition of utterances in a source domain;
- defining a target domain relative to the source domain as having at least one of:
  - a different codec by which utterances are encoded than the source domain;
  - a different field depth than the source domain; or
  - a different average pitch than the source domain;
- in parallel to providing utterances according to the source domain to the teacher model, providing utterances according to the target domain to a student model;
- determining whether posteriors produced by the student model from the target domain utterances converge with posteriors produced by the teacher model from the source domain utterances;
- in response to determining that the posteriors converge, finalizing the student model for use in speech recognition in the target domain; and
- in response to determining that the posteriors do not converge, updating parameters of the student model based on the posteriors.

16. The computer readable storage device of claim 15, wherein the target domain utterances comprise transformed utterances of the source domain.

17. The computer readable storage device of claim 16, wherein the target domain utterances are transformed from the utterances of the source domain according to at least one of:
- overlaying a new signal with the source domain utterances;
- adjusting a parameter of the source domain utterances; and
- frequency warping the source domain utterances.

18. The computer readable storage device of claim 15, wherein determining whether the posteriors produced by the student model converge with the posteriors produced by the teacher model further comprises:
- calculating a divergence score between the posteriors produced by the student model and the produced by the teacher model;
- comparing the divergence score to a convergence threshold;
- in response to the divergence score satisfying the convergence threshold, determining that the posteriors converge; and
- in response to the divergence score not satisfying the convergence threshold, determining that the posteriors do not converge.

19. The computer readable storage device of claim 15, wherein the posteriors indicate probabilities of which senones are present in a given frame of a given utterance.

20. The computer readable storage device of claim 15, further comprising cloning the teacher model to produce the student model.

* * * * *